United States Patent [19]
Carter et al.

[11] Patent Number: 5,878,844
[45] Date of Patent: Mar. 9, 1999

[54] BALL SCREW JOINT FOR AN AUTOMATED GUIDED VEHICLE

[75] Inventors: Paul T. Carter, Salt Lake City; Paul K. Gines, Kaysville, both of Utah

[73] Assignee: HK Systems, Inc., New Berlin, Wis.

[21] Appl. No.: 747,534

[22] Filed: Nov. 12, 1996

[51] Int. Cl.$^6$ ..................................................... B66F 9/20
[52] U.S. Cl. ........................ 187/233; 187/226; 187/267; 187/268
[58] Field of Search ................... 187/226, 233, 187/267, 268

[56] References Cited

U.S. PATENT DOCUMENTS

| | | | |
|---|---|---|---|
| 1,227,646 | 5/1917 | Metz | 187/233 |
| 1,407,124 | 2/1922 | Carr | 187/267 |
| 2,188,686 | 1/1940 | Kersting et al. | 187/267 |
| 3,309,060 | 3/1967 | Villars | 187/267 |
| 3,568,804 | 3/1971 | Olsen | 187/267 |
| 3,688,920 | 9/1972 | Frish | 187/267 |
| 4,782,920 | 11/1988 | Gaibler et al. | 187/226 |

FOREIGN PATENT DOCUMENTS

| | | | |
|---|---|---|---|
| 264061 | 9/1913 | Germany | 187/267 |

OTHER PUBLICATIONS

Power Trac Design Guide, Rolled Thread Ball Screws & Mounting Blocks Nook Industries, 1990. pp. 3–39.

Primary Examiner—David A. Bucci
Assistant Examiner—Steven B. McAllister
Attorney, Agent, or Firm—Nilles & Nilles, S.C.

[57] ABSTRACT

An automated guided vehicle for carrying a load comprises a mast, a lift carriage, a ball screw drive assembly and a ball screw joint. The ball screw drive assembly has a lift nut and a vertically oriented ball screw. The ball screw joint operatively couples the drive assembly to the lift carriage so as to transmit upward vertical forces from the drive assembly to the lift carriage. The ball screw joint includes first, second, third and fourth shafts which permit the lift nut to move in any horizontal direction and to pivot about any horizontal axis with respect to the lift carriage. As a result, the ball screw joint advantageously prevents the transmission of horizontal forces and angular moments between the ball screw and the lift nut, thereby reducing the wearing out effects of component misalignment on the ball screw assembly.

19 Claims, 3 Drawing Sheets

BALL SCREW JOINT FOR AN AUTOMATED GUIDED VEHICLE

FIELD OF THE INVENTION

The present invention relates to a load lifting mechanism having a vertically oriented ball screw used for vertically reciprocating a lift carriage, especially a lift carriage of an automated guided vehicle, wherein the load lifting mechanism comprises a ball screw joint which effectively prevents transmission of horizontal forces and angular moments between components of the power drive assembly.

BACKGROUND OF THE INVENTION

Automated guided vehicles are known for various material handling applications which generally involve moving loads around a facility such as a warehouse. To this end, an automated guided vehicle (AGV) comprises a vehicle chassis having a plurality of wheels which allow the vehicle to traverse a floor of the warehouse. The AGV also comprises a mast and a lift carriage, the lift carriage being vertically movable along the mast to allow the AGV to deposit and retrieve loads from various heights. The AGV is thus able to pick up, move and deposit loads at various locations within the warehouse.

To achieve vertical mobility of the lift carriage along the mast, the AGV further comprises a power drive assembly formed of a vertically oriented ball screw matingly engaged with a lift nut. The ball screw is coupled to an electric motor which drives the ball screw. The lift nut is mounted (though not necessarily directly) to the lift carriage. As the ball screw rotates, it imparts a vertical force on the lift nut and thereby on the lift carriage. The lift carriage further comprises rollers which are disposed in vertically oriented brackets of the mast and which guide the vertical movement of the lift carriage. The lift carriage is thus raised or lowered (depending on the direction of rotation of the ball screw) along the mast as the ball screw rotates.

An important condition for the proper rotation of the ball screw with respect to the lift nut is that the ball screw and the lift nut must be in perfect alignment. To the extent that the ball screw and lift nut are misaligned, horizontal forces and angular moments between the ball screw and the lift nut contribute to a premature wearing out of the ball screw. It has been found that a misalignment of only a few thousandths of an inch can significantly decrease the life of the power drive assembly.

Generally speaking, misalignment of the lift nut with respect to the ball screw is caused by a misalignment of two or more of the remaining components of the mast, power drive assembly and lift carriage. Accordingly, one way to ensure near-perfect alignment is to use highly precise manufacturing tolerances when specifying the dimensions of the respective components of the mast, power drive assembly, and lift carriage. However, this approach is unsatisfactory because highly precise manufacturing tolerances make the respective components expensive to manufacture.

Thus, what is needed is an alternative way to avoid the application of angular moments and translational forces between the ball screw and the lift nut and thereby increase the life of the ball screw assembly.

BRIEF SUMMARY OF THE INVENTION

A load lifting assembly for a vehicle which carries a load is presented. The load lifting assembly comprises a mast, a lift carriage, a vertically oriented power drive assembly, and first and second tube-shaped rings. The vertically oriented power drive assembly vertically supports the lift carriage and vertically moves the lift carriage along the mast. The first and second tube-shaped rings operatively couple the power drive assembly to the lift carriage so as to transmit upward vertical forces from the power drive assembly to the lift carriage. Advantageously, the first and second tube-shaped rings effectively prevent transmission of horizontal forces and angular moments between components of the power drive assembly.

Preferably, this is accomplished by having one of the two rings be an inner ring and having the other of the two rings be an outer ring. The outer ring is pivotable about a first horizontal axis and is movable in a first direction which is perpendicular to the first horizontal axis. The inner ring is pivotable about a second horizontal axis, which is perpendicular to the first horizontal axis, and is movable in a second direction which is perpendicular to the second horizontal axis. Together, the inner and outer rings permit the lift nut to move in any horizontal direction and to pivot about any horizontal axis, thereby correcting any misalignment and preventing the transmission of horizontal forces and angular moments between the lift nut and the ball screw.

In a variation, an automated guided vehicle for carrying a load comprises a mast, a lift carriage, a ball screw drive assembly and a ball screw joint. The ball screw drive assembly has a lift nut and a vertically oriented ball screw. The ball screw joint operatively couples the drive assembly to the lift carriage so as to transmit upward vertical forces from the power drive assembly to the lift carriage. Advantageously, the ball screw joint effectively prevents the transmission of horizontal forces and angular moments between components of the drive assembly.

To this end, the ball screw joint includes first, second, third and fourth shafts. The first and second shafts define a first horizontal axis and permit the lift nut to pivot about the first horizontal axis. Additionally, the first and second shafts are movable in a first direction which is perpendicular to the first horizontal axis. The third and fourth shafts define a second horizontal axis which is perpendicular to the first horizontal axis and permit the lift nut to pivot about the second horizontal axis. Moreover, the third and fourth shafts are movable in a second direction which is perpendicular to the second horizontal axis. Together, the first, second, third and fourth shafts permit the lift nut to move in any horizontal direction and to pivot about any horizontal axis.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 1A:
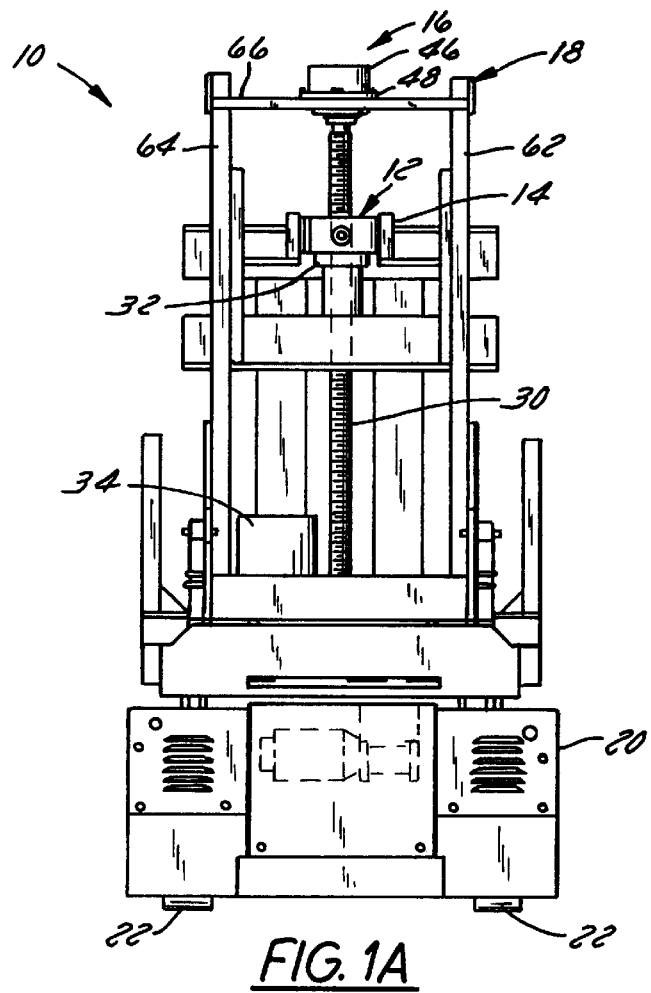
FIGS. 1A and 1B illustrate front view and side views, respectively, of an automated guided vehicle incorporating a ball screw joint according to the present invention.
Figure 1B:
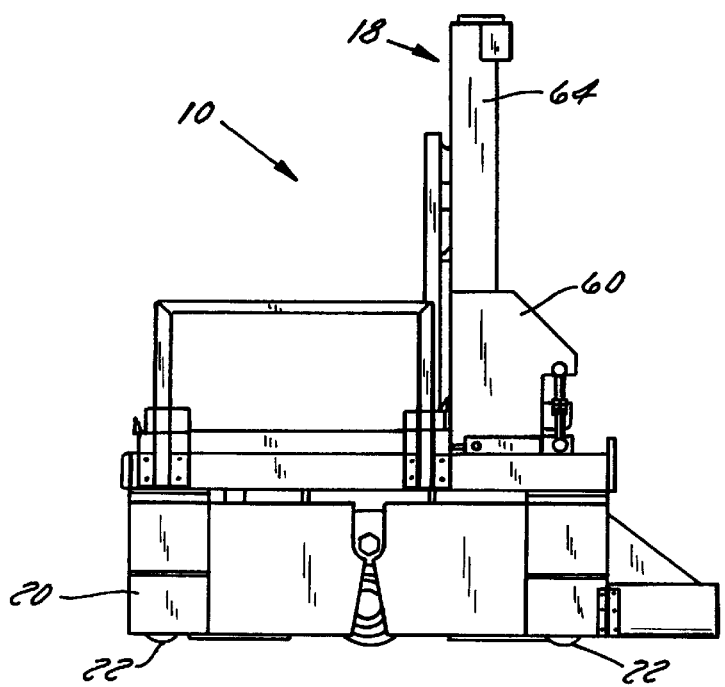
Figure 2:
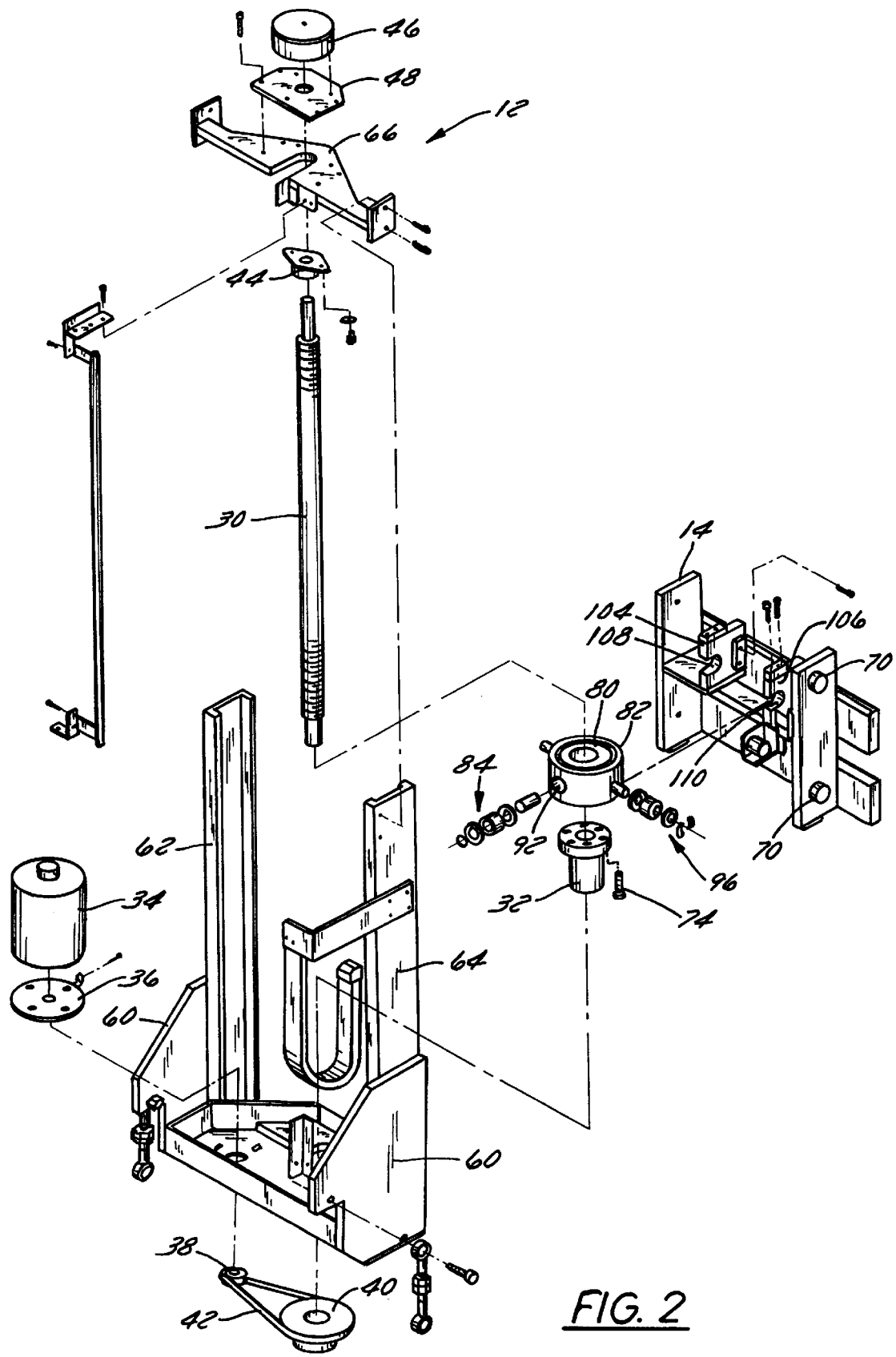
FIG. 2 illustrates a detailed view of a ball screw joint used in conjunction with a mast, power drive assembly, and lift carriage according to the present invention.

Reference is now made to FIGS. 1A–1B and FIG. 2. FIGS. 1A and 1B illustrate front and side views, respectively, of a load lifting vehicle such as an automated guided vehicle (AGV) 10 in accordance with the present invention. FIG. 2 illustrates a more detailed view of a ball screw joint 12 and associated components in accordance with the present invention.

By way of general overview, the AGV 10 comprises the ball screw joint 12, a lift carriage 14, a power drive assembly 16 and a mast 18. The lift carriage 14 is vertically movable along the mast 18 allowing the AGV 10 to deposit and retrieve loads from various heights. Vertical mobility is achieved by way of the power drive assembly 16 which is formed of a vertically oriented ball screw 30 having threads which matingly engage with threads of a lift nut 32. The lift nut 32 is mounted to the lift carriage 14 by way of the ball screw joint 12. Thus, the lift carriage 14 is raised or lowered (depending on the direction of rotation of the ball screw 30) along the mast 18 as the ball screw 30 rotates. This enables the AGV 10 to deposit and retrieve loads as it traverses a warehouse floor, for example, using wheels 22 disposed on a chassis 20.

More specifically, the power drive assembly 16 comprises the vertically oriented ball screw 30, the lift nut 32, and an electric motor 34. The electric motor 34 is mounted to the AGV 10 by way of a motor adapter plate 36 and drives a drive sprocket 38. A belt 42 couples the drive sprocket 38 to a driven sprocket 40 which is itself coupled to the ball screw 30. As a result, torque created at the electric motor 34 is transferred to the ball screw 30 by way of the drive sprocket 38, the belt 42 and the drive sprocket 40.

At its upper end, the ball screw 30 is horizontally supported by a brace 66. A block bearing 44 disposed between the brace 66 and the ball screw 30 allows the ball screw 30 to rotate. However, a brake 46 is also mounted to the brace 66 and may be controlled so as to apply a braking force to the ball screw 30. The brake 46 is mounted to the brace 66 by way of a brake adapter plate 48.

Preferably, the lift nut 32 has dual ball bearing circuits formed therein which provide lubrication between the ball screw 30 and the lift nut 32. The ball screw 30 and lift nut 32 in the illustrated embodiment are sold by Nook Industries, Inc., 23200 Commerce Park Road, Cleveland, Ohio, 44122. It should be understood, however, that any suitable ball screw, lift nut and block bearing may be used.

The ball screw 30 is disposed generally parallel with vertically disposed mast brackets. 62 and 64 of the mast 18. The mast 18 includes a mast weldment 60 which mounts lower ends of the mast brackets 62 and 64 to the AGV chassis 20. The upper ends of the mast brackets 62 and 64 are joined by the brace 66, which also horizontally supports the ball screw 30 as previously mentioned. The lift carriage 14 includes a plurality of rollers 70 which are disposed in channels formed in the mast brackets 62 and 64 and which guide the vertical movement of the lift carriage 14 along the mast 18.

Generally speaking, it is assumed that at least some of the above-identified components (and perhaps others which have not been specifically identified) will be misaligned. As explained above, although the extent of misalignment may be very small and is usually not intentional, such misalignment is nevertheless detrimental. For this reason, the present invention utilizes the ball screw joint 12, which prevents the transmission of angular moments and horizontal forces which would otherwise cause the ball screw 30 and lift nut 32 to prematurely wear out.

Figure 3A:
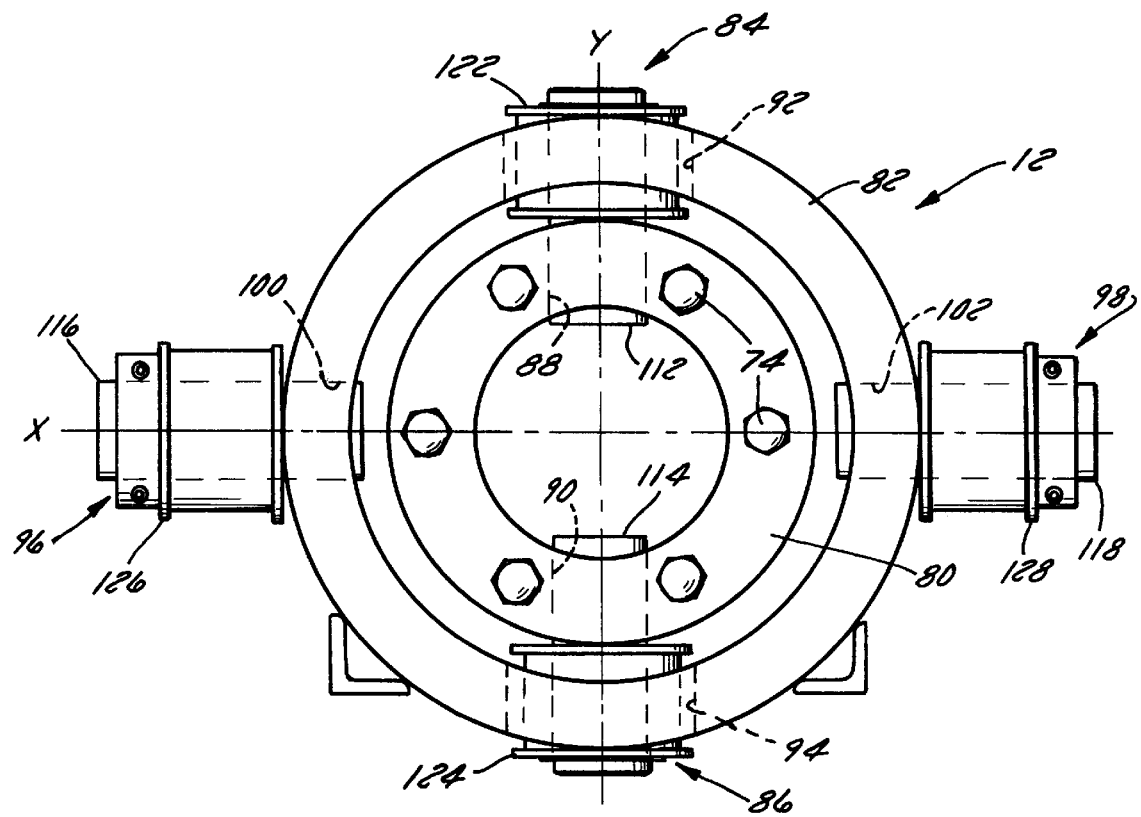
FIGS. 3A and 3B illustrate top and front views, respectively, of a ball screw joint according to the present invention.
Figure 3B:
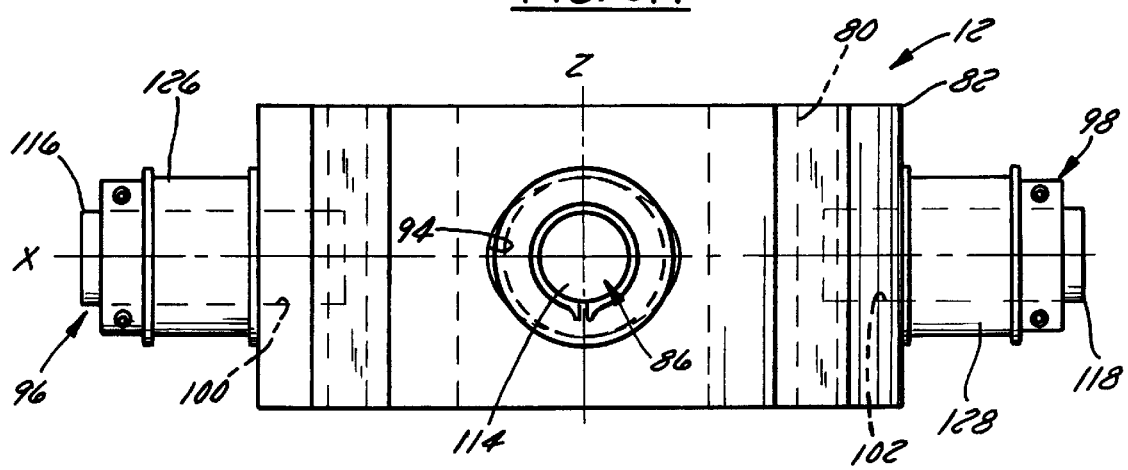

FIGS. 3A and 3B illustrate top and front views, respectively, of the ball screw joint 12 according to the present invention. The ball screw joint 12 comprises an inner ring 80, an outer ring 82, inner shafts 84 and 86 and outer shafts 96 and 98.

The inner ring 80 is formed of a circular steel tube which, in the illustrated embodiment, is about 4 inches long (i.e., such that height of the inner ring 80 is about 4 inches), has an outer diameter of about 5½ inches, and has an inner diameter of about 3 inches. The lift nut 32 is mounted to the inner ring 80 by a plurality of fasteners 74.

The inner ring 80 has first and second holes 88 and 90 formed therein which are used to mount inner shafts 84 and 86 to the inner ring 80. The inner shafts 84 and 86 define a Y-axis of rotation, and respectively extend from the first and second holes 88 and 90 in the inner ring 80 to first and second holes 92 and 94 in the outer ring 82. The holes 88 and 90 are diametrically opposed, as are the holes 92 and 94.

The outer ring is formed of a circular steel tube which, in the illustrated embodiment, is about 4 inches long (i.e., such that height of the outer ring 82 is about 4 inches), has an outer diameter of about 8½ inches, and has an inner diameter of about 6½ inches. Preferably, the first and second holes 92 and 94 are elongated along the perimeter of the outer ring 82, as illustrated, such that translational movement along the X-axis of the inner shafts 84 and 86 and the inner ring 80 relative to the outer ring 82 is permitted. In the illustrated embodiment, the elongated holes 92 and 94 have a "long" diameter of about 2½ inches and a "short" diameter of about 2 inches.

The outer ring 82 has third and fourth holes 100 and 102 formed therein which are used to mount outer shafts 96 and 98 to the outer ring 82. The outer shafts 96 and 98 define an X-axis of rotation and extend from third and fourth holes 100 and 102 in the outer ring 82 to slots 108 and 110 defined in horizontal lift carriage brackets 104 and 106. In the illustrated embodiment and as shown in FIG. 2, the slots 108 and 110 have a height of about 2 inches, are about 5 to 5½ inches long, and the brackets 104 and 106 are made of a steel plate whose thickness is 1¼ inches. The slots 108 and 110 formed in the brackets 104 and 106 are thus also elongated so as to permit translational movement along the Y-axis of the outer shafts 96 and 98 and hence the outer ring 82 relative to the brackets 104 and 106.

The shafts 84, 86, 96 and 98 each respectively comprise steel rods 112, 114, 116 and 118 and are coupled to bearing assemblies 122, 124, 126 and 128, respectively. In the illustrated embodiment, the diameter of the steel rods 112, 114, 116, and 118 is about 1¼ inches and the length of the shaft is about 3 to 3½ inches.

The operation of the ball screw joint depends on the manner in which the components of the AGV 10 are misaligned. The following four examples illustrate four basic possibilities which may occur.

As a first example, assume that the ball screw 30 is completely parallel with the mast brackets 62 and 64, however, the ball screw 30 is displaced along the X-axis (e.g., the ball screw 30 is 0.005" too far to the left as the vehicle is viewed from the front). In this case, the leftward displacement of the ball screw 30 is accommodated by a corresponding leftward displacement of the inner ring 80 with respect to the outer ring 82, and more specifically by a leftward displacement of the inner shafts 84 and 86 within the elongated holes 92 and 94, respectively. Since the ball screw 30 is parallel with the mast brackets 62 and 64, the amount of displacement within the elongated holes 92 and 94 does not change as the lift carriage 14 ascends and descends the mast 18.

As a second example, assume that the ball screw 30 is again completely parallel with the mast brackets 62 and 64, however, the ball screw 30 is displaced along the Y-axis (e.g., the ball screw 30 is 0.005" too far forward). In this case, the forward displacement of the ball screw. 30 is accommodated by a corresponding forward displacement of the outer ring 82 with respect to the lift carriage 14, and more specifically by a forward displacement of the outer shafts 96 and 98 within the slots 108 and 110 of the brackets 104 and 106, respectively. Since the ball screw 30 is parallel with the mast brackets 62 and 64, the amount of displacement within the brackets 62 and 64 does not change as the lift carriage 14 ascends and descends the mast 18.

As a third example, assume that the ball screw 30 is not displaced along either the X-axis or the Y-axis, however, the ball screw 30 is angularly displaced about the Y-axis (e.g., has somewhat of a leftward tilt). Due to the leftward tilt, the inner shafts 84 and 86 oscillate back and forth within the elongated holes 92 and 94 as the lift nut 32 ascends and descends the ball screw 30. (In other words, as the lift nut 32 ascends and descends the ball screw 30, the leftward displacement of the lift nut 32 varies since the ball screw 30 is tilted leftward.) In this case, the leftward tilt of the ball screw 30 is accommodated in two ways. First, the inner ring 80 tilts leftward with respect to the outer ring 82, and thus permits angular displacement of the lift nut 32 relative to the lift carriage 14. This tilting action is accomplished by the inner shafts 84 and 86. Second, the varying leftward displacement of the lift nut 32 is accommodated by a corresponding varying leftward displacement of the inner ring 80 with respect to the outer ring 82, or by a corresponding varying leftward displacement of the inner shafts 84 and 86 within the elongated holes 92 and 94.

As a final example, again assume that the ball screw 30 is not displaced along either the X-axis or the Y-axis, however, the ball screw 30 is angularly displaced about the X-axis (e.g., has somewhat of a forward tilt). In a manner generally analogous to that just described, the forward tilt of the ball screw 30 is accommodated in two ways. First, the outer ring 82 (and thus the inner ring 80) tilts forward with respect to the brackets 104 and 106. This tilting action is accomplished by the outer shafts 96 and 98. Second, the outer shafts 96 and 98 oscillate back and forth within the slots 108 and 110 of the brackets 104 and 106 as the lift nut 32 ascends and descends the ball screw 30 to accommodate the varying forward displacement of the lift nut 32.

In practice, combinations of the four basic possibilities may also occur. For example, the ball screw 30 and/or the mast brackets 62 and 64 might not be inherently straight but rather could be warped. Further, even if the ball screw 30 and the mast brackets 62 and 64 are inherently straight, they could become bowed when the AGV 10 picks up a heavy load.

It should be seen from the preceding examples that, since the lift nut 32 is able to be angularly displaced on either the X-axis or the Y-axis, it is angularly displaceable with respect to the lift carriage on any horizontal axis. Further since the lift nut 32 may be displaced along either the X-axis or the Y-axis, it is displaceable with respect to the lift carriage in any horizontal direction. As a result, any horizontal misalignment between the lift nut 32 and the ball screw 30 (which is generally caused by a misalignment of the remaining components of the AGV 10) is corrected, and the transmission of horizontal forces and angular moments between the lift nut 32 and the ball screw 30 is prevented.

Further, it should be noted that, since lift nut 32 is intended to move vertically along the Z-axis, misalignment along the Z-axis is not a concern. Further, since the lift nut 32 is intended to move because of rotation of the ball screw 30 on the Z-axis, an angular moment about the Z-axis is not a concern. Accordingly, the ball screw joint accommodates all of the possible types of misalignment which are of concern.

Many changes and modifications may be made to the present invention without departing from the spirit thereof. For example, the tube-shaped rings need not be made from circular tubes but rather could also be made from other shapes of tubes such as square tubes thereby resulting in square tube-shaped rings. The scope of these and other changes will become apparent from the appended claims.

We claim:

1. A load lifting assembly for a vehicle which carries a load, said load lifting assembly comprising:
   (A) a mast;
   (B) a lift carriage which vertically supports said load and which is vertically moveable along said mast;
   (C) a power drive assembly having a vertically orientated elongate ball screw and a lift nut threadingly moveable along said ball screw, whereby said power drive assembly vertically supports said lift carriage and vertically moves said lift carriage along said mast; and
   (D) a ball screw joint having a first ring and a second ring concentrically disposed within said first ring and said rings moveable relative to one another, said joint operatively coupling said lift nut and said ball screw of said power drive assembly to said lift carriage so as to transmit upward vertical forces from said power drive assembly to said lift carriage and prevent transmission of forces in any horizontal direction and angular moments about any horizontal axis between components of said power drive assembly.

2. The load lifting assembly according to claim 1, wherein said first ring and said second ring prevent transmission of horizontal forces and angular moments caused by misalignment of at least some components of said load lifting assembly.

3. The load lifting assembly according to claim 1, wherein said lift nut has threads matingly engaged with threads of said ball screw and wherein said lift nut is mounted to one of said first and second rings so that said lift nut is movable in any horizonal direction and pivotable about any horizontal axis.

4. The load lifting assembly according to claim 1, wherein said first ring encircles said second ring without contact between an inner surface of said first ring and an outer surface of said second ring.

5. The load lifting assembly according to claim 1, further comprising first and second inner shafts,
   wherein said first and second inner shafts extend respectively through a pair of first diametrically opposed holes in said first ring and respectively through a pair of second diametrically opposed holes in said second ring, and
   wherein said first and second inner shafts are constructed and arranged so as to permit angular displacement of said second ring relative to said first ring about a first axis defined by said first and second inner shafts.

6. The load lifting assembly according to claim 5, further comprising first and second outer shafts, wherein said first and second outer shafts extend respectively through a pair of third diametrically opposed holes in said first ring and through a pair of fourth holes carried in opposed brackets on said lift carriage, and wherein said first and second outer shafts are constructed and arranged so as to permit angular displacement of said first ring relative to said lift carriage about a second axis which is perpendicular to said first axis.

7. The load lifting assembly according to claim 5, wherein said pair of first holes in said first ring are elongate along a perimeter of said first ring to permit horizontal translational movement of said first and second inner shafts thus permitting horizontal translational movement of said second ring relative to said first ring.

8. The load lifting assembly according to claim 6, wherein said pair of fourth holes in said brackets are horizontal slots to permit horizontal translational movement of said first and second outer shafts and thus permit horizontal translational movement of said first ring relative to said brackets.

9. The load lifting assembly according to claim 1, wherein said second ring is moveable in a horizontal direction relative to said first ring.

10. The load lifting assembly according to claim 1, wherein said first ring is moveable in a horizontal direction relative to said lift carriage.

11. A load lifting assembly for a vehicle which carries a load, said load lifting assembly comprising:

(A) a mast;

(B) a lift carriage which vertically supports said load and which is vertically moveable along said mast;

(C) a power drive assembly which vertically supports said lift carriage and which vertically moves said lift carriage along said mast, said power drive assembly having a vertically oriented ball screw which rotates on a substantially vertical axis and a lift nut having threads which are matingly engaged with threads of said ball screw;

(D) first and second tube-shaped rings which operatively couple said power drive assembly to said lift carriage, said lift nut being mounted to one of said first and second rings and being movable in any horizonal direction and being pivotable about any horizontal axis so as to transmit upward vertical forces from said power drive assembly to said lift carriage and so as to effectively prevent transmission of horizontal forces and angular moments between components of said power drive assembly, wherein said first ring and said second ring have walls of an equal height and of an equal thickness and wherein said first ring has a diameter which is larger than a diameter of said second ring such that said first ring encircles said second ring without contact between an inner tube surface of said first ring and an outer tube surface of said second ring when said first and second rings are concentrically disposed on the same axis;

(E) first and second inner shafts which extend respectively through first and second diametrically opposed holes in said first ring and respectively through first and second diametrically opposed holes in said second ring wherein said first and second holes in said first ring are elongated along a perimeter of said first ring and permit horizontal movement of said first and second inner shafts, and; wherein said first and second inner ring shafts are constructed and arranged so as to permit angular displacement of said first ring relative to said second ring about a first axis which extends (i) through said first and second diametrically opposed holes in said first ring and (ii) through said first and second diametrically opposed holes in said second ring; and (F) first and second outer shafts which extend respectively through third and fourth diametrically opposed holes in said first ring and through first and second brackets on said lift carriage wherein said first and second brackets have respective first and second slots formed therein which permit horizontal movement of said first and second outer shafts, and wherein said first and second outer ring shafts are constructed and arranged so as to permit angular displacement of said first ring relative to said lift carriage about a second axis which is perpendicular to said first axis.

12. The load lifting assembly according to claim 11, wherein said power drive assembly further comprises a motor coupled to and intermittently driving said ball screw; and a brake coupled to and intermittently applying a braking force to said ball screw.

13. An automated guided vehicle for carrying a load, said automated guided vehicle comprising:

(A) a mast;

(B) a lift carriage for vertically supporting said load;

(C) a ball screw drive assembly vertically supporting said lift carriage and capable of moving said lift carriage vertically along said mast, said drive assembly further including (1) a vertically oriented ball screw which rotates about a substantially vertical axis, and (2) a lift nut having threads matingly engaged with threads of said ball screw, said lift nut ascending and descending said ball screw depending on a direction of rotation of said ball screw; and (D) a ball screw joint operatively coupling said drive assembly to said lift carriage to transmit upward vertical forces from said drive assembly to said lift carriage and to effectively prevent transmission of horizontal forces and angular moments between said ball screw and said lift nut, said ball screw joint further including (1) an outer ring pivotable about a first horizontal axis, and horizontally movable in a first translational direction perpendicular to said first horizontal axis, and (2) an inner ring pivotable about a second horizontal axis perpendicular to said first horizontal axis, and horizontally movable in a second translational direction perpendicular to said second horizontal axis.

14. The automated guided vehicle according to claim 13, wherein said inner and outer rings prevent transmission of horizontal forces and angular moments caused by misalignment of at least some components of said load lifting assembly.

15. The automated guided vehicle according to claim 13, further comprising first and second inner shafts, said first and second inner shafts extending respectively through a pair of first diametrically opposed holes in said outer ring and respectively through a pair of second diametrically opposed holes in said inner ring, and said first and second inner shafts defining said second horizontal axis on which said inner ring is pivotable.

16. The automated guided vehicle according to claim 15, further comprising first and second outer shafts, said first and second outer shafts extending respectively through a pair of third diametrically opposed holes in said outer ring and through a pair of fourth holes carried in opposed brackets on said lift carriage, and said first and second outer shafts defining said first horizontal axis on which said outer ring is pivotable.

17. The automated guided vehicle according to claim 16,
wherein said pair of fourth holes are slots to permit horizontal movement of said first and second outer shafts in said first translational direction, and
wherein said pair of first holes in said outer ring are elongate along a perimeter of said outer ring to permit horizontal movement of said first and second inner shafts in said second translational direction.

18. The automated guided vehicle according to claim 13, wherein said inner and outer rings are circular tube-shaped rings.

19. A load lifting assembly for a load carrying and lifting vehicle, said load lifting assembly comprising:
an upstanding mast;
a vertically orientated elongate ball screw;
a lift carriage vertically movable along said ball screw;
a lift nut threadingly engaging said ball screw; and
a ball screw joint coupling said ball screw and said lift nut to said lift carriage,
wherein said ball screw joint has a first ring and a second ring concentrically disposed within said first ring whereby said first ring can rotate relative to a horizontal plane about an axis and translate along said horizontal plane and wherein said second ring can rotate about said horizontal plane and relative to said first ring and can translate horizontally along said horizontal plane and relative to said first ring.

* * * * *

UNITED STATES PATENT AND TRADEMARK OFFICE
CERTIFICATE OF CORRECTION

PATENT NO.   : 5,878,844
DATED        : Mar. 9, 1999
INVENTOR(S)  : Carter et al.

It is certified that error appears in the above-identified patent and that said Letters Patent is hereby corrected as shown below:

Col. 3, line 53, after "brackets" delete the period

Col. 5, line 13, after "screw" delete the period

Col. 8, line 15, delete "ring".

Signed and Sealed this

Tenth Day of August, 1999

Attest:

Q. TODD DICKINSON

*Attesting Officer*   Acting Commissioner of Patents and Trademarks